United States Patent [19]
Nelson

[11] Patent Number: 4,774,880
[45] Date of Patent: Oct. 4, 1988

[54] COLLECTOR TRAY AND CUT FRUIT SUPPORT FOR JUICING MACHINE

[75] Inventor: Stewart C. Nelson, Forest Hills, N.Y.

[73] Assignee: The Automatic Orange Juicer Corporation, Forest Hills, N.Y.

[21] Appl. No.: 119,678

[22] Filed: Nov. 12, 1987

[51] Int. Cl.⁴ .............................................. A23N 1/00
[52] U.S. Cl. ....................................... 100/97; 99/507; 99/508; 100/130; 100/135
[58] Field of Search ................. 99/495, 501, 506–508; 100/97 R, 125, 130, 135, 213, 215, 218, 264, 268

[56] References Cited

U.S. PATENT DOCUMENTS

| | | |
|---|---|---|
| 2,723,618 | 11/1955 | Matthews .............................. 100/97 |
| 4,479,425 | 10/1984 | Nelson .................................. 99/507 |
| 4,509,418 | 4/1985 | Nelson .................................. 99/507 X |

*Primary Examiner*—Timothy F. Simone
*Attorney, Agent, or Firm*—Anthony J. Casella; Gerald E. Hespos

[57] ABSTRACT

A collector tray and a cut fruit support for an automatic juicing apparatus are provided. The collector tray comprises a bottom wall, a pair of opposed upstanding end walls and opposed upstanding front and rear walls to define an open top tray for collecting fruit juices. A pair of cones extend upwardly from the bottom wall and define structures against which generally hemispherical sections of fruit are urged to express the juices therefrom. Mounting brackets extend outwardly from the front and rear walls. An elastomeric cut fruit support is mounted to the mounting brackets of the front and rear walls and extend substantially continuously between the front and rear walls such that portions of the front and rear walls disposed forwardly and rearwardly of the collector tray are angularly aligned to the front and rear walls and to portions of the cut fruit support disposed between the front and rear walls. The uppermost edges of the front and rear walls are constructed to minimize friction between the collector tray and the cut fruit support.

14 Claims, 2 Drawing Sheets

COLLECTOR TRAY AND CUT FRUIT SUPPORT FOR JUICING MACHINE

BACKGROUND OF THE INVENTION

Machines are widely employed to extract juices from oranges and other citrus fruits. The typical machine for extracting juices from citrus fruits includes a means for at least partly severing the fruit to expose the juice-containing pulp, and means for expressing the juices from the exposed pulp.

Examples of well known and effective juicing machines are shown in U.S. Pat. No. 2,311,565 dated Feb. 16, 1943 and U.S. Pat. No. 2,629,317 dated Feb. 24, 1953, both of which issued to T. G. Nelson. These patents show juicing machines having means for sequentially delivering oranges, grapefruits or the like to a blade means for cutting each generally spherical fruit in half. The generally hemispherical halves of each piece of fruit are then delivered to the vicinity of conical members, such that the freshly cut generally planar surfaces of the fruit are in register with the conical members. These hemispherical fruit sections are then urged over the conical members of the prior art machine, such that the juice contained in the pulp is expressed therefrom. These prior art machines then typically include means for collecting the expressed fruit juices and means for removing the remains of the fruit to permit the same procedures to be carried out on the next piece of fruit.

U.S. Pat. No. 4,479,425 issued to Stewart C. Nelson on Oct. 30, 1984 and is assigned to the assignee of the subject invention. U.S. Pat. No. 4,479,425 shows improvements relating to the blade for bisecting the pieces of citrus fruit and for delivering the bisected fruit to an elastomeric surface extending over the cones of the machine. More particularly, the cones which express the juices from the hemispherical sections of fruit are disposed in a generally rectangular collector tray, having opposed pairs of upwardly extending walls which substantially surround the cones. The elastomeric material onto which the hemispherical sections of fruit are delivered is stretched over two opposed walls of the collector tray and is mounted in face-to-face relationship to exterior portions of those opposed side walls. More particularly, this elastomeric surface extends and is stretched in a direction generally parallel to a line connecting the two cones, and generally perpendicular to the direction along which the hemispherical sections of fruit are delivered. The juicing apparatus described in U.S. Pat. No. 4,479,425 urges the hemispherical sections of fruit over the cones such that the elastomeric supporting surface temporarily conforms to the shapes of the cones and is disposed between the hemispherical sections of fruit and the cones. This elastomeric supporting surface further includes a plurality of parallel ribs which contribute to the expressing of the juice, and a plurality of apertures which permit the expressed juice to pass through the elastomeric supporting surface. When the juicing action is completed, the means for urging the hemispherical sections of fruit over the cones is withdrawn and the elastomeric supporting surface returns to substantially its initial shape enabling the remains of the fruit to be removed and enabling the next hemispherical sections of fruit to be properly positioned.

U.S. Pat. No. 4,509,418 dated Apr. 9, 1985 also issued to Stewart C. Nelson, and also is assigned to the assignee of the subject invention. The juicing machine shown and described in U.S. Pat. No. 4,509,418 is functionally and structurally similar to the above described juicing machine. As with the previously described juicing machine, an elastomeric supporting surface for the cut fruit extends over the base in which the cones are mounted and is joined in face-to-face relationship with the outwardly facing surfaces of two opposed parallel walls of the base. Also, as with the previously described embodiment, the portions of the elastomeric supporting surface disposed outwardly from said base are aligned substantially perpendicular to the central portion of the elastomeric supporting surface. However, the elastomeric supporting surface of the juicing machine shown in U.S. Pat. No. 4,509,418 extends and is stretched in a direction generally parallel to the direction of delivery of the fruit and generally orthogonal to a line extending between the two cones. As explained in the specification, this orientation of the elastomeric supporting surface prevents the pulp of the fruit and associated seeds from being deposited within the collector tray and clogging the drain therefrom. The disclosures of the above described patents are incorporated herein by reference.

The above described prior art offers many significant advantages. However, it has been observed that the elastomeric supporting surface on which the hemispherical sections of fruit are supported periodically wears through and requires replacement. Upon further investigation, it was determined that the failure of the elastomeric supporting surface typically initially occurs adjacent the top of one of the side walls of the collector tray over which the elastomeric supporting surface is stretched. More particularly, it was observed that with each operation of the prior art juicing machines, the stretching of the elastomeric supporting surface causes substantial friction between the elastomeric supporting surface and the top of the side wall over which the elastomeric material is stretched. This repeated frictional interaction eventually causes total failure of the elastomeric supporting surface in proximity to the friction, despite comparative lack of wear at other locations thereon.

In view of the above, it is an object of the subject invention to provide a juicing apparatus with lower maintenance requirements.

It is another object of the subject invention to provide a juicing machine with a cut fruit elastomeric supporting surface of substantially increased durability.

A further object of the subject invention is to provide a juicing machine with a cut fruit supporting surface that can be easily changed.

Still a further object of the subject invention is to provide a juicing machine with a low cost cut fruit elastomeric supporting surface that prevents fruit pulp and seeds from clogging the drain for the juices.

SUMMARY OF THE INVENTION

The subject invention is directed to the collector tray and cut fruit support surface for use in a juicing machine. The collector tray comprises a bottom wall and an array of upstanding side walls extending from the bottom wall and connected thereto to define an open-topped collector tray for collecting fruit juices. The collector tray further comprises a pair of spaced apart generally convex cones extending upwardly from the bottom wall. The bottom wall, the upstanding side walls and the cones may be of integral construction.

The collector tray may further comprise at least one port from which the juices collected therein may be removed.

Preferably, the upstanding side walls of the collector tray comprise a pair of opposed generally parallel front and rear walls. The front and rear walls may extend generally parallel to a line connecting the two cones of the collector tray. The front and rear walls of the collector tray each comprise at least one mounting bracket on the outwardly facing sides thereof. The mounting brackets may be disposed intermediate the open top and closed bottom of the collector tray. Preferably, a plurality of mounting brackets extend from the front wall of the collector tray and another plurality of mounting brackets extend from the rear wall of the collector tray.

The top and outwardly facing edges of both the front and rear walls may be generally arcuate in shape. In particular, the top edge of both the front and rear walls of the collector tray may be defined by rollers which may extend substantially the entire length of the front and rear walls respectively.

A cut fruit support extends substantially entirely across the open top of the collector tray, and defines a flexible surface upon which the cut pieces of fruit are placed for juicing. The cut fruit support is characterized by a plurality of apertures extending therethrough to permit the passage of the fruit juices into the collector tray. The cut fruit support may further comprise a plurality of ribs to guide the cut pieces of fruit into the proper position and to facilitate the complete expression of the juice from the fruit. More particularly, the cut fruit support is formed from an elastomeric material which can be stretched to conform to the general shape of the collector tray, but which will further return substantially to its initial shape to permit the next pieces of fruit to be placed thereon.

The cut fruit support is securely but removably mounted to the mounting brackets of the collector tray. More particularly, the configuration of the mounting brackets ensures that the cut fruit support mounted thereon will not undergo a sharp right angle bend adjacent the tops of the respective front and rear walls of the collector tray. Rather, the cut fruit support mounted to the respective front and rear mounting brackets will undergo an acute angle bend from the plane defined by the portion of the cut fruit support disposed intermediate the front and rear walls. This orientation of the cut fruit support will minimize the friction and wear imposed upon the cut fruit support during each cycle of the juicing machine. In particular, the angular alignment of the cut fruit support at the top edges of the front and rear walls of the collector tray will minimize the friction and other forces created upon the cut fruit support as the cut fruit support is stretched over the cones of the collector tray.

The frictional forces created between the cut fruit support and the collector tray can be further reduced if the top outwardly facing edges of the front and rear walls on the collector tray are arcuate in configuration, as noted above. More particularly, the arcuate configuration of the top outwardly facing edges of the front and rear walls greatly facilitates the movement of the cut fruit support relative to the collector tray during each cycle of the juicing machine. Friction and wear can be further reduced by rotatably mounting a roller at the top of the front and rear walls of the collector tray. The roller will rotate about its longitudinal axis as the cut fruit support is stretched over the cones. This rolling action substantially minimizes the frictional forces created by the movement of the cut fruit support relative to the front and rear walls of the collector tray.

The cut fruit support may be formed with reinforcing rods adjacent its front and rear edges respectively. Additionally, the cut fruit support may comprise mounting apertures located substantially adjacent the reinforcing rods and in alignment with the mounting brackets of the collector tray. The mounting apertures are dimensioned to receive at least portions of the mounting brackets of the collector tray.

In use, the mounting apertures of the cut fruit support are secured to the mounting brackets on one side of the collector tray. The remainder of the cut fruit support is then stretched over the collector tray to enable the opposed mounting brackets to be received in the remaining mounting apertures. The juicing machine is then operated to feed an orange or other fruit down the feed chute, and causing the fruit to be severed by the blade mounted on the cam pedestal of the apparatus. The several halves of the fruit then are fed onto the cut fruit support substantially in line with the cones of the collector tray. The apparatus is then operated to urge the fruit downwardly over the cones of the collector tray to express the juice from the fruit. This downward movement of the fruit toward the cones requires the stretching of the cut fruit support, and relative movement between the cut fruit support and the upstanding walls of the collector tray. However, the generally acute angle alignment of the cut fruit support as it extends over the walls of the collector tray substantially reduces the frictional forces and wear exerted on the cut fruit support. Arcuately configured top edges of the walls of the collector tray or rollers mounted adjacent the top edges of the collector tray can further reduce the friction and wear occurring as the cut fruit support is stretched. The substantially reduced friction increases the life of the cut fruit support, and substantially minimizes down time for the juicing machine.

DETAILED DESCRIPTION OF THE PREFERRED EMBODIMENT

Figure 1:
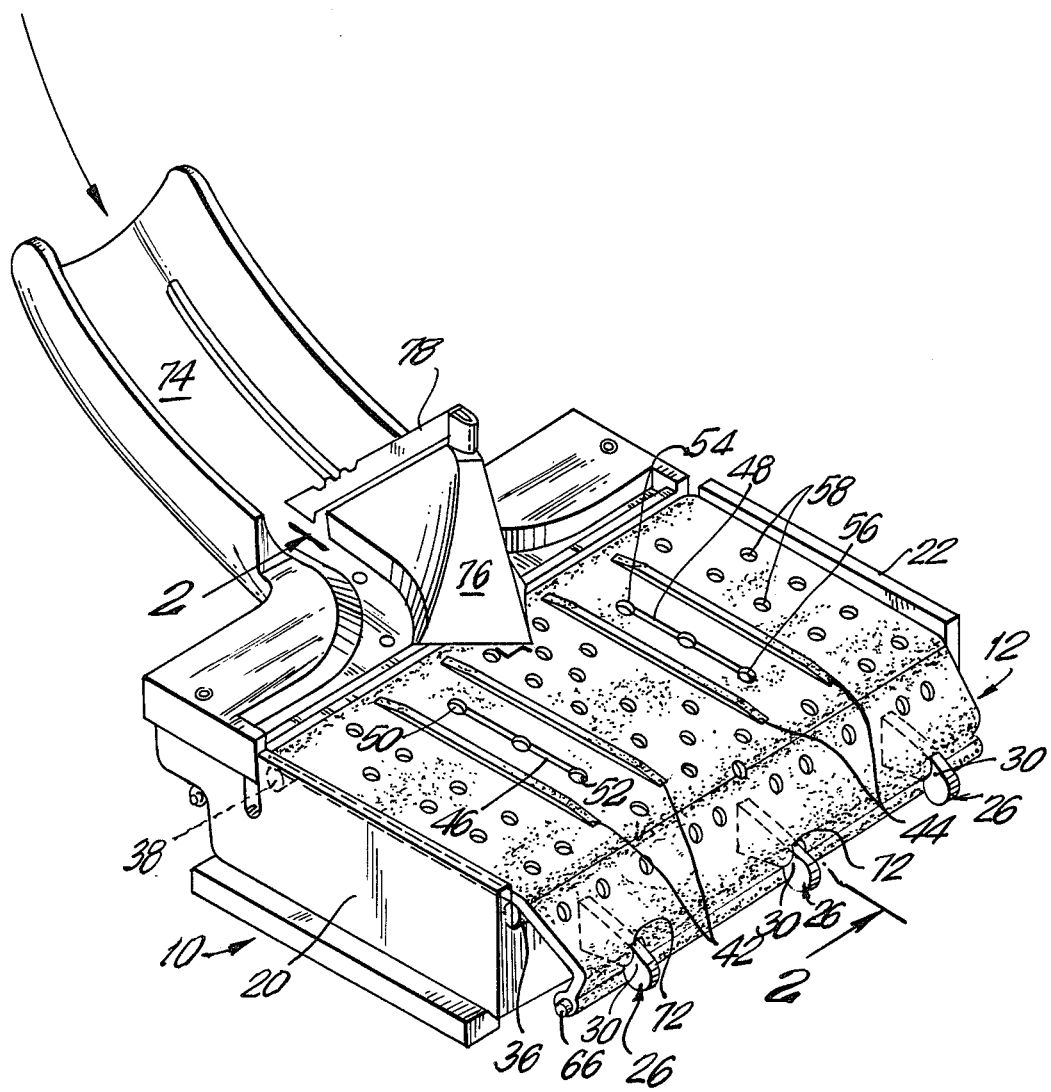
FIG. 1 is a perspective view of the collector tray and cut fruit support of the subject invention.
Figure 2:
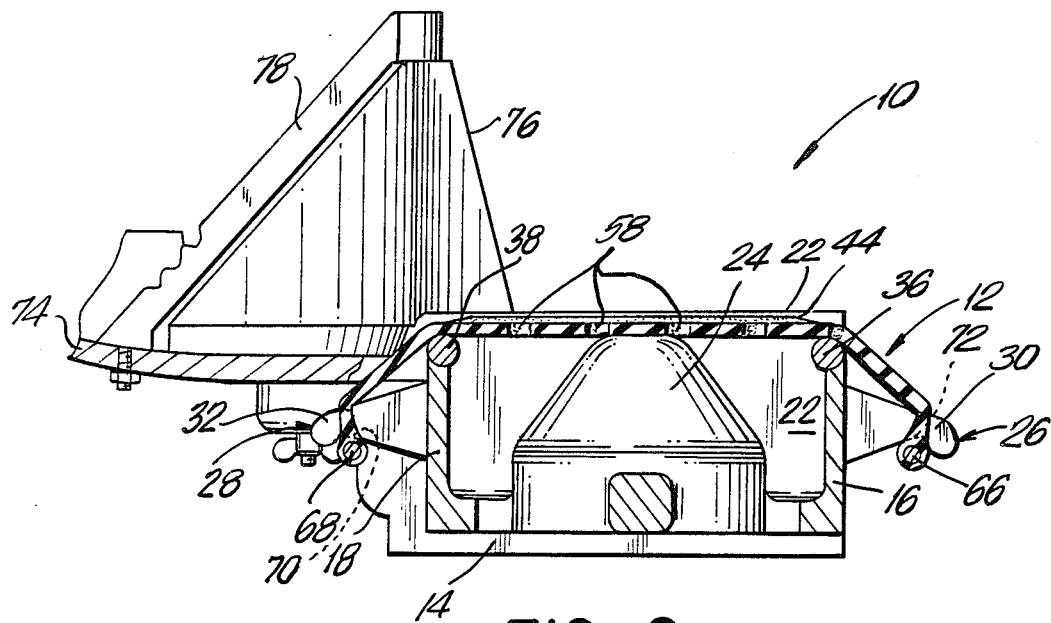
FIG. 2 is a cross-sectional view taken along line 2—2 of FIG. 1.

The subject invention is directed to a collector tray and a cut fruit support for a juicing machine which are indicated respectively by the numerals 10 and 12 in FIGS. 1 and 2. The collector tray 10 is a generally rectangular structure with a bottom wall 14. Opposed generally parallel upstanding front and rear walls 16 and 18 are connected to and extend generally orthogonally from the bottom wall 14. Opposed upstanding generally parallel end walls 20 and 22 extend from and are connected to the bottom wall 14 and are further connected to the front and rear walls 16 and 18 such that the collector tray 10 defines a substantially open topped structure for receiving fruit juices.

The collector tray 10 further comprises a pair of convex cones 24 which extend upwardly from the bottom wall 14 of the collector tray 10. More particularly, the cones 24 are disposed such that a line connecting the apexes of the cones 24 would extend substantially parallel to the opposed front and rear walls 16 and 18. The cones 24 are dimensioned to substantially conform to the size and shape of a hemispherical section of the fruit to be juiced.

The collector tray 10 further comprises a plurality of front mounting brackets 26 extending outwardly from the front wall 16, and a plurality of rear mounting brackets 28 extending outwardly from the rear wall 18. More particularly, the front and rear mounting brackets 26 and 28 are rigidly mounted to the respective front and rear walls 16 and 18 and are disposed intermediate the bottom wall 14 and the open top of the collector tray 10. Furthermore, the front and rear mounting brackets 26 and 28 include minimum dimension portions 30 and 32 respectively which are spaced from the front and rear walls and which are dimensioned to engage corresponding portions of the cut fruit support 12 as explained in greater detail below.

The collector tray 10 further comprises front and rear rollers 36 and 38 rotatably mounted respectively adjacent the edges of the front and rear walls 16 and 18 most distant from the bottom wall 14. More particularly, the front and rear rollers 36 and 38 extend generally parallel and adjacent the respective front and rear walls 16 and 18 and are rotatably mounted at their respective ends to the end walls 20 and 22.

The cut fruit support 12 is formed from an elastomeric material, and is structurally substantially similar to the cut fruit support depicted in U.S. Pat. No. 4,509,418 which issued to the applicant herein and which is assigned to the assignee of the subject application. As noted above, the disclosure of U.S. Pat. No. 4,509,418 is incorporated herein by reference. With reference to FIG. 1 herein, the cut fruit support 12 includes a first pair of ribs 42 and a second pair of ribs 44 all of which extend substantially parallel to one another and to the end walls 20 and 22 of the collector tray 10. The ribs 42 are disposed substantially symmetrically on opposite sides of one cone 24, while the ribs 44 are disposed substantially symmetrically on opposite sides of the other cone. The cut fruit support 12 further is characterized by slits 46 and 48 which are substantially aligned with the apexes of the respective cones 24. As explained in U.S. Pat. No. 4,509,418, the slit 46 terminates at apertures 50 and 52 while the slit 48 terminates at apertures 54 and 56. The apertures 50-56 prevent the slits 46 and 48 from ripping further when the cut fruit support 12 is stretched during each juicing operation. The cut fruit support 12 further comprises a plurality of apertures 58 which are provided to permit the juices expressed from the cut fruit to pass through the cut fruit support 12 and into the collector tray 10.

The cut fruit support 12 further comprises substantially rigid front and rear reinforcing rods 66 and 68 at the respective opposed ends thereof adjacent to the front and rear walls 16 and 18. In particular, the elastomeric material of the cut fruit support 12 is formed around the respective reinforcing rods 66 and 68. The cut fruit support 12 further comprises a plurality of front mounting apertures 70 and a plurality of rear mounting apertures 72 disposed in proximity to the respective front and rear reinforcing rods 66 and 68. More particularly, the front mounting apertures 70 are spaced from one another to be disposed substantially in line with the respective front mounting brackets 26. Similarly, the rear mounting apertures 72 are spaced from one another to be disposed substantially in line with the respective rear mounting brackets 28. Furthermore, the front and rear mounting apertures 70 and 72 are dimensioned to enable adjacent portions of the cut fruit support 12 to be urged over the corresponding front and rear mounting brackets 26 and 28. However, the dimensions of the front and rear mounting apertures 70 and 72 are selected to prevent the portions of the cut fruit support 12 adjacent the reinforcing rods 66 and 68 from advancing beyond the narrow portions 30 and 32 of the front and rear mounting brackets 26 and 28. As a result of this construction, and as shown most clearly in FIG. 2, the portions of the cut fruit support 12 disposed forwardly and rearwardly of the front and rear walls 16 and 18 respectively are angularly spaced from the front and rear walls 16 and 18 by angles of at least approximately 30° and preferably about 45°. More particularly, these portions of the cut fruit support 12 extending beyond the front and rear walls 16 and 18 are aligned at an angle of approximately 45° to the generally planar portion of the cut fruit support 12 disposed intermediate the front and rear walls 16 and 18.

The collector tray 10 and the cut fruit support 12 are mounted in proximity to the bottommost portion of the feed chute 74 and in proximity to the cam pedestal 76 and the blade 78 mounted thereon. In operation, a whole fruit, such as an orange or grapefruit, is gravitationally fed down the feed chute 74 and is urged into the blade 78, such that the fruit is cut into two substantially identical generally hemispherical sections. The hemispherical sections of fruit are guided toward the cut fruit support 12 in part by the cam pedestal 76 on which the blade 78 is mounted. More particularly, the hemispherical sections of fruit are deposited with their respective planar cut surfaces facing downwardly on the cut fruit support 12 and generally in line with the respective cones 24.

A press member (not shown) of the juicing machine is then moved toward the cones to urge the hemispherical sections of fruit and the adjacent areas of the cut fruit support 12 downwardly and over the cones 24 to express the juice from the fruit. As noted above, the elastomeric material of the cut fruit support 12 is stretched considerably as it is urged over the cones 24. This stretching will cause portions of the cut fruit support 12 that had been disposed outside the collector tray 10 to pass over the front and rear walls 16 and 18 of the collector tray 10. As the cut fruit support 12 moves inwardly due to this stretching action, the front and rear rollers 36 and 38 will rotate to avoid or substantially reduce the friction that would have otherwise occurred at the interface between the cut fruit support 12 and the tops of the respective front and rear walls 16 and 18 of the collector tray 10. Similarly, when the press member (not shown) of the juicing apparatus is moved upwardly and away from the cones 24, the cut fruit support 12 returns to its initial condition. Thus, portions of the cut fruit support 12 that has been stretched inwardly and over the front and rear walls 16 and 18 will return to their initial positions forwardly and rearwardly of the front and rear walls 16 and 18 respectively. During this retraction of the cut fruit support 12 to its initial position, the rollers 36 and 38 will again rotate about their respective longitudinal axes to ensure that friction between the cut fruit support 12 and the collector tray 10 is eliminated or substantially reduced. As a result of this elimination or substantial reduction of friction, the life of the cut fruit support 12 is significantly increased, and the down time for the juicing machine is decreased.

Figure 3:
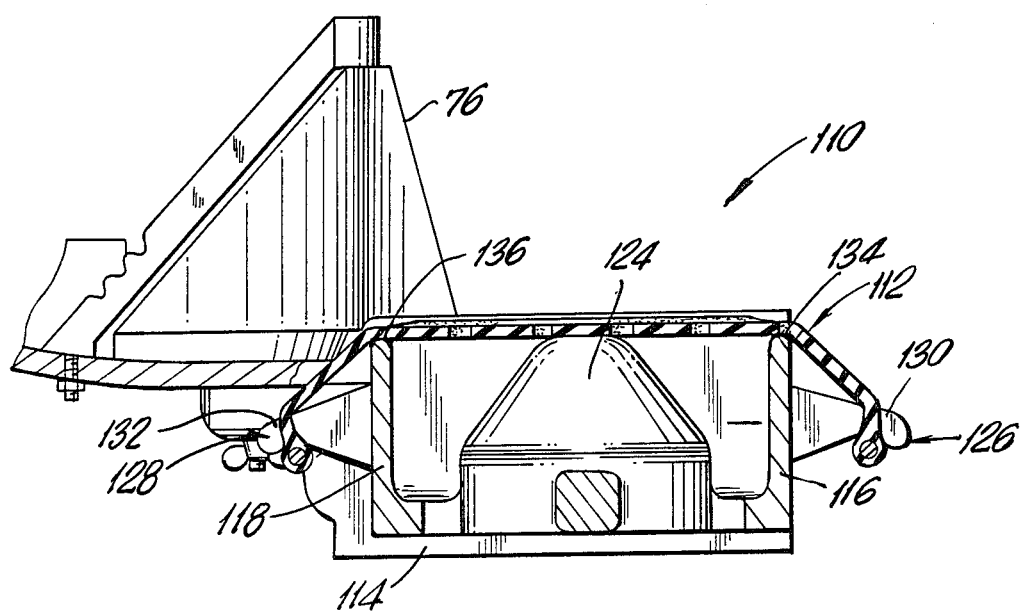
FIG. 3 is a cross-sectional view similar to FIG. 2 but showing an alternate embodiment of the subject invention.

An alternate embodiment of the subject invention is illustrated in FIG. 3. In particular, the apparatus illustrated in FIG. 3 comprises a collector tray 110 having a bottom wall 114 and opposed front and rear walls 116 and 118. The front wall 116 includes a plurality of front mounting brackets 126, while the rear wall 118 includes a plurality of rear mounting brackets 128. As with the previously described embodiment, the mounting brackets 126 and 128 extend forwardly and rearwardly of the respective front and rear walls 116 and 118. Additionally, the front mounting brackets 126 include a narrow dimensioned portion 130, while the rear mounting brackets 128 include a comparable narrowed portion 132.

The collector tray 110 illustrated in FIG. 3 is somewhat different from the collector tray shown in FIGS. 1 and 2 in that it does not include rollers. Rather, the front and rear walls 116 and 118 include arcuate portions 134 and 136 on their respective edges most distant from the bottom wall 114.

The apparatus illustrated in FIG. 3 includes a cut fruit support 112 substantially identical to the cut fruit support 12 described and illustrated above. The cut fruit support 112 is mounted on the mounting brackets 126 and 128 as shown in FIG. 3, and similar to the mounting as shown in FIG. 2. During operation of the juicing apparatus, the cut fruit support 112 is advanced over the cones 124 causing a substantial stretching of the cut fruit support 112 and movement between the cut fruit support 112 and the arcuate edges 134 and 136 of the collector tray 110. The arcuate configuration of the edges 134 and 136 and the angular alignment of the cut fruit support 112 contributes substantially to a reduction in the frictional forces between the cut fruit support 112 and the collector tray 110 both when the cut fruit support 112 is being stretched and when it is elastically retracting to its initial position.

In summary, a combination collector tray and cut fruit support is provided for an automatic juicing apparatus. The collector tray comprises a bottom wall, a pair of opposed upstanding end walls and opposed upstanding front and rear walls. A pair of cones extend upwardly from the bottom wall of the collector tray and define structures against which generally hemispherical sections of cut fruit are pressed to express the juices therefrom. The front and rear walls include outwardly extending mounting brackets securely mounted thereto at locations intermediate the bottom wall and the open top of the collector tray. In one embodiment the collector tray comprises rollers mounted parallel to the front and rear walls and rotatably mounted adjacent the uppermost portions thereof. In another embodiment, the outwardly facing top edges of the front and rear walls are arcuate in configuration. The cut fruit support of the subject invention includes mounting apertures at spaced locations along opposed ends thereof. The mounting apertures are dimensioned and located to accept the mounting brackets of the collector tray. The configuration of the mounting brackets and the mounting apertures is such that when the cut fruit support is mounted to the collector tray, the portions of the cut fruit support disposed outwardly from the collector tray are angularly spaced from the opposed front and rear walls of the collector tray. More particularly, the portions of the cut fruit support extending frontwardly and rearwardly of the front and rear walls are aligned to the front and rear walls at angles of greater than 30° and preferably approximately 45°. As a result of this construction, friction between the cut fruit support and the collector tray is minimized during a juicing operation. Specifically, the embodiments wherein rollers are disposed adjacent the front and rear walls enable a rolling interaction between the collector tray and the cut fruit support both during the elastic stretching of the cut fruit support which occurs during a juicing operation and the elastic retraction of the cut fruit support at the end of a juicing operation. Similarly, the embodiments having no roller but arcuate upper edges on the front and rear walls substantially reduce friction by virtue of the arcuate configuration of these edges of the front and rear walls and the angular alignment of the cut fruit support.

While the invention has been described with respect to certain preferred embodiments, it is understood that various amendments can be made without departing from the scope of the invention as defined by the appended claims.

What is claimed is:

1. A collector tray for an automatic juicing machine having an elastomeric support for supporting cut fruit, said collector tray comprising:
   a bottom wall;
   opposed upstanding end walls connected to and extending from said bottom wall;
   opposed upstanding front and rear walls connected to and extending from said bottom wall and said opposed end walls;
   a pair of cones extending upwardly from said bottom wall; and
   front and rear mounting brackets connected to and extending from outwardly facing portions of said front and rear walls respectively, said front and rear mounting brackets each including mounting portions at locations thereon spaced from the respective front and rear walls, said mounting portions defining means for engaging the elastomeric support such that said elastomeric support is angularly aligned to said front and rear walls, whereby the angular alignment of the elastomeric support reduces wear on the support during operation of the juicing machine.

2. A collector tray as in claim 1 wherein said front and rear walls each include top edges defining portions thereof most distant from the bottom wall, and wherein the front and rear mounting brackets are disposed at locations on said respective front and rear walls intermediate the bottom wall of said collector tray and the top edge of the respective front and rear walls.

3. A collector tray as in claim 2 wherein the top edges of the front and rear walls are generally arcuate.

4. A collector tray as in claim 2 further comprising front and rear rollers extending parallel to the front and rear walls and being rotatably mounted adjacent the top edges of the respective front and rear walls.

5. A collector tray as in claim 4 wherein the front and rear rollers each include pairs of opposed ends, and wherein the opposed ends of the front and rear rollers are rotatably mounted in the opposed end walls of said collector tray.

6. A collector tray as in claim 1 comprising a plurality of front mounting brackets and a plurality of rear mounting brackets.

7. A collector tray as in claim 6 wherein the mounting portion of each front mounting bracket and each rear mounting bracket defines a portion of minimum dimension on said corresponding mounting bracket.

8. A collector tray as in claim 1 wherein the cones are disposed such that a line extending therebetween is substantially parallel to said front and rear walls.

9. A collector tray for an automatic juicing machine comprising:
   a bottom wall;
   a pair of upstanding front and rear walls connected to and extending from said bottom wall;
   a pair of cones connected to and extending from said bottom wall such that a line between said cones extends generally parallel to said front and rear walls;
   a plurality of front mounting brackets extending from the side of said front wall opposite said rear wall, each said front mounting bracket including a mounting portion at a location thereon spaced from said front wall;
   a plurality of rear mounting brackets connected to said rear wall and extending from the side thereof opposite said front wall, each said rear mounting bracket including a mounting portion at a location thereon spaced from said rear wall; and
   an elastomeric cut fruit support removably mounted to the mounting portions of said front and rear mounting brackets and extending substantially continuously between the top edges of said front and rear walls, such that portions of said cut fruit support disposed forwardly and rearwardly of said front and rear walls respectively are angularly aligned to said front and rear walls, whereby the angular alignment of the portions of the cut fruit support relative to said front and rear walls reduces frictional wear between the cut fruit support and the front and rear walls.

10. A collector tray as in claim 9 wherein the portions of said cut fruit support disposed forwardly and rearwardly of said front and rear walls are angularly aligned to said front and rear walls at angles of at least approximately 30°.

11. A collector tray as in claim 9 wherein said cut fruit support includes opposed generally parallel front and rear edges, said front and rear edges being defined by reinforcing rods formed from substantially rigid material incorporated into said cut fruit support, said cut fruit support further comprising a plurality of front and rear mounting apertures disposed at spaced apart locations adjacent said front and rear reinforcing rods, and substantially aligned with the corresponding front and rear mounting brackets of said collector tray.

12. A collector tray as in claim 9 wherein said front and rear walls each includes top edges defining the portions thereof most distant from said bottom wall, and wherein said collector tray further comprises rollers extending generally parallel to said front and rear walls and being rotatably mounted adjacent the top edges thereof.

13. A collector tray for an automatic juicing machine, said collector tray comprising:
   a bottom wall;
   opposed upstanding front and rear walls extending from said bottom wall;
   front and rear mounting brackets connected to and extending from said respective front and rear walls such that the front mounting brackets extend away from said rear wall, and said rear mounting brackets extend away from said front wall, said front and rear mounting brackets including mounting portions at locations thereon spaced from the respective front and rear walls; and
   a cut fruit support formed from an elastomeric material, said cut fruit support extending between said front and rear walls and being connected to the mounting portions of the respective front and rear mounting brackets, such that the portions of said cut fruit support intermediate the front and rear walls and the corresponding front and rear mounting brackets are angularly spaced from the corresponding front and rear walls for reducing wear between the elastomeric material and the front and rear walls during operation of the juicing machine.

14. A collector tray as in claim 3 further comprising a cut fruit support formed from an elastomeric material, said cut fruit support extending between said front and rear walls and being connected to the mounting portions of the respective front and rear mounting brackets, such that the portions of said cut fruit support intermediate the front and rear walls and the corresponding front and rear mounting brackets are angularly spaced from the corresponding front and rear walls.

* * * * *